Patented June 21, 1949

2,473,497

UNITED STATES PATENT OFFICE 2,473,497

UNSATURATED HETEROCYCLIC ALCOHOL

Newman M. Bortnick, Philadelphia, Pa., assignor to Röhm & Haas Company, Philadelphia, Pa., a corporation of Delaware No Drawing. Application November 4, 1947, Serial No. 784,083

3 Claims. (Cl. 260—333)

This invention relates to 2,5-dimethyl-2-hydroxymethyl-2,3-dihydropyran and to its preparation.

I have found that methacrolein forms a dimer which upon reduction yields a new unsaturated primary alcohol of the formula

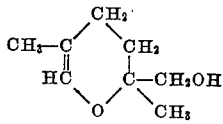

This alcohol is of considerable interest as an intermediate for the preparation of esters having valuable solvent and plasticizing action. In this connection esters of dibasic acids, such as sebacic, azelaic, and adipic, are of particular interest. The ester of this new alcohol and thiocyanoacetic acid is a powerful insecticide.

The dimer of methacrolein is formed when methacrolein is stored in the presence of a polymerization inhibitor for several months or more. Accompanying monomer is readily stripped from the dimer on distillation. The dimer is distillable at 171–2° C.

Synthesis of methacrolein dimer may be hastened by heating methacrolein under pressure. Thus, methacrolein heated with a trace of hydroquinone at 100°–138° C. for seven hours in a bomb gave a yield of 92% of the dimer. Analysis of this product corresponded to that for 2,5-dimethyl-2-formyl-2,3-dihydropyran. It forms a semicarbazone, melting at 174–7° C.

The dimer can be pyrolyzed to monomeric methacrolein upon being heated at 250° to 550° C.

When the dimer is heated with hydrogen under pressure in the presence of hydrogenation catalysts, the formyl group is reduced to a methylol group. Temperatures of 50° C. to 250° C. are generally suitable and pressures of 50 lbs. to several thousand pounds, the optimum conditions depending upon the reactivity of the catalyst selected. Copper chromite catalysts are particularly desirable and readily permit interruption of the reaction when one mole of hydrogen has been absorbed per mole of dimer. The desired alcohol is then readily separated from the reaction mixture.

There were mixed in a hydrogenation bomb 100 grams of 2,5,-dimethyl-2-formyl-2,3-dihydropyran and 5 grams of a barium-containing copper chromite. Hydrogen was run into the bomb at 100 lbs. pressure and the bomb heated at 150° to 175° C. for three hours, when the molar ratio of hydrogen absorbed to dimer was one to one. The bomb was cooled. The reaction mixture was filtered and some of the filtrate was distilled. From about 75 grams of filtrate there were obtained 68 grams of product, distilling at 101–3°/23 mm. and having a refractive index, $n_D^{20}$, of 1.4710. The compound contained 67.21% of carbon and 9.85% by analysis, corresponding well with theoretical values of 67.61% and 9.86% respectively for $C_8H_{14}O_2$.

I claim:

1. As a new chemical compound, 2,5-dimethyl-2-hydroxymethyl-2,3-dihydropyran.

2. The process of preparing 2,5-dimethyl-2-hydroxymethyl-2,3-dihydropyran which comprises reacting one mole of 2,5-dimethyl-2-formyl-2,3-dihydropyran with one mole of hydrogen in the presence of a hydrogenation catalyst.

3. The process of claim 2 in which the catalyst is a copper chromite catalyst.

NEWMAN M. BORTNICK.

REFERENCES CITED

The following references are of record in the file of this patent:

UNITED STATES PATENTS

| Number | Name | Date |
|---|---|---|
| 2,368,186 | Wickert et al. | Jan. 30, 1945 |